(12) United States Patent
Oh et al.

(10) Patent No.: US 11,822,800 B2
(45) Date of Patent: Nov. 21, 2023

(54) STORAGE SYSTEM INCLUDING HOST AND STORAGE DEVICE AND OPERATION METHOD THEREOF

(71) Applicant: SAMSUNG ELECTRONICS CO., LTD., Suwon-si (KR)

(72) Inventors: Hyunkyo Oh, Yongin-si (KR); Sanghyun Choi, Seoul (KR); Heewon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/848,820

(22) Filed: Jun. 24, 2022

(65) Prior Publication Data

US 2023/0054286 A1 Feb. 23, 2023

(30) Foreign Application Priority Data

Aug. 20, 2021 (KR) .................. 10-2021-0110306

(51) Int. Cl.
*G06F 3/06* (2006.01)
*G06F 12/06* (2006.01)

(52) U.S. Cl.
CPC .......... *G06F 3/0634* (2013.01); *G06F 3/0607* (2013.01); *G06F 3/0611* (2013.01); *G06F 3/0658* (2013.01); *G06F 3/0688* (2013.01); *G06F 12/0646* (2013.01)

(58) Field of Classification Search
CPC .... G06F 3/0634; G06F 3/0607; G06F 3/6011; G06F 3/0658; G06F 3/0688; G06F 3/0608; G06F 3/061; G06F 3/0679; G06F 3/0643; G06F 12/0292; G06F 12/0246; G06F 12/0646; G06F 12/0284; G06F 12/02
See application file for complete search history.

(56) References Cited

U.S. PATENT DOCUMENTS

| | | |
|---|---|---|
| 8,078,794 B2 | 12/2011 | Lee et al. |
| 8,209,466 B2 | 6/2012 | Garratt |
| 8,214,582 B2 | 7/2012 | Lee et al. |
| 8,667,215 B2 | 3/2014 | Marotta et al. |
| 8,762,622 B2 * | 6/2014 | Moshayedi ........... G06F 3/0613 711/170 |
| 8,954,655 B2 | 2/2015 | Jean et al. |
| 8,995,183 B2 | 3/2015 | Shepard et al. |
| 9,158,671 B2 | 10/2015 | Ryu et al. |

(Continued)

*Primary Examiner* — Khoa D Doan
(74) *Attorney, Agent, or Firm* — F. Chau & Associates, LLC

(57) ABSTRACT

Provided are a storage system including a host and a storage device, and an operation method of the storage system. The storage device includes a memory controller and a memory device, where an operation method of the memory controller includes receiving from the host a first mode change request for a folder, which is a unit for managing at least one file, and a logical address of the at least one file, and in response to the first mode change request, rewriting to the memory device first data corresponding to the logical address in a second operating mode, and invalidating first data which is existing data already written to correspond to the logical address and the first data in a first operating mode, wherein the first mode change request sets a data operation speed to a high-speed mode for the at least one file included in the folder.

20 Claims, 12 Drawing Sheets

(56) References Cited

U.S. PATENT DOCUMENTS

| | | |
|---|---|---|
| 9,390,004 B2 | 7/2016 | Radke et al. |
| 10,824,353 B2 | 11/2020 | Igahara et al. |
| 10,901,622 B2 | 1/2021 | Cariello et al. |
| 2008/0172520 A1* | 7/2008 | Lee .................... G11C 11/5628 711/E12.001 |
| 2009/0248965 A1 | 10/2009 | Lee et al. |
| 2020/0174667 A1 | 6/2020 | Lee et al. |

* cited by examiner

STORAGE SYSTEM INCLUDING HOST AND STORAGE DEVICE AND OPERATION METHOD THEREOF

CROSS-REFERENCE TO RELATED APPLICATION

This application claims priority under 35 U.S.C. § 119 to Korean Patent Application No. 10-2021-0110306, filed on Aug. 20, 2021, in the Korean Intellectual Property Office, the disclosure of which is incorporated by reference herein in its entirety.

FIELD

The present disclosure relates to a storage system, and more particularly, to a storage system including a host and a storage device, and an operation method thereof.

DISCUSSION

Non-volatile memories may retain stored data even when power is cut off. In particular, storage devices including a flash-based non-volatile memory have been widely used. An example of a storage system including a storage device based on a flash memory device and a host device includes a solid-state drive (SSD).

When data is stored in an SSD, either input/output speed or storage space may be maximized. It may be technically difficult to simultaneously maximize both input/output speed and storage space, so the SSD may be used efficiently by determining whether to prioritize the input/output speed, or securing storage space, according to characteristics of data.

SUMMARY

The present disclosure provides a storage system including a host for setting a data operation speed of a plurality of files in units of folders, and a storage device, and an operation method of the storage system.

According to an embodiment of the present disclosure, an operation method of a memory controller connected to a memory device is provided, including receiving from a host a first mode change request for a folder, which is a unit for managing at least one file, and a logical address of the at least one file, and in response to the first mode change request, rewriting to the memory device first data corresponding to the logical address in a second operating mode, and invalidating first data which is existing data already written to correspond to the logical address and the first data in a first operating mode, wherein the first mode change request sets a data operation speed to a high-speed mode for the at least one file included in the folder.

According to an embodiment of the present disclosure, there is provided an operation method of a host connected to a storage device including a memory device, including setting, by the host, an operating mode of a folder, which is a unit for managing at least one file, to a first operating mode, generating a first mode change request for setting a data operation speed to a high-speed mode for the at least one file and extracting a logical address of the at least one file, adding information of the folder to a management table, providing the first mode change request and the logical address to the storage device, and receiving a response including whether writing of the at least one file is successful according to a storage space of the storage device with respect to the first mode change request.

According to an embodiment of the present disclosure, there is provided a storage system including a host and a storage device, wherein the host includes a mode manager configured to, create a first mode change request and extract a logical address of data as an operating mode of the data is set to a first operating mode for setting at least one of a write speed or a read speed of the data to a high speed, and a storage driver configured to create a management table including a path of the data and provide the first mode change request and the logical address to the storage device, wherein the storage device is configured to rewrite the data in a single-level cell (SLC) and invalidate existing data already written in a multi-level cell (MLC) or a triple-level cell (TLC) of the memory device to correspond to the data and the logical address, in response to the first mode change request.

BRIEF DESCRIPTION OF THE DRAWINGS

Embodiments of the present disclosure will be more clearly understood from the following detailed description taken in conjunction with the accompanying drawings, in which.

DETAILED DESCRIPTION

Hereinafter, embodiments of the present disclosure are described in detail with reference to the accompanying drawings.

Figure 1:
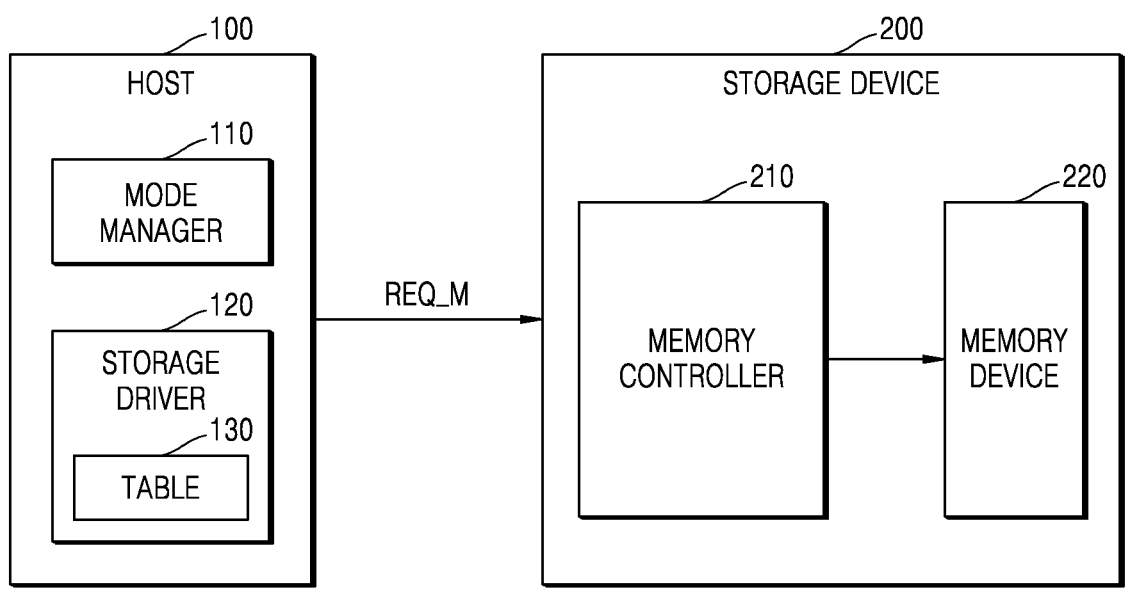
FIG. 1 is a block diagram illustrating a storage system according to an embodiment of the present disclosure.

FIG. 1 illustrates a storage system according to an embodiment of the present disclosure.

Referring to FIG. 1, a storage system 10 may include a host device 100 and a storage device 200. A mode change request REQ_M is created by the host device 100, and the storage device 200 may receive the mode change request REQ_M and perform a write operation or an erase operation.

The storage system 10 may be implemented as, for example, a personal computer (PC), a data server, a network-attached storage (NAS), an Internet of Things (IoT) device, or a portable electronic device. The portable electronic device may include laptop computers, mobile phones, smartphones, tablet PCs, personal digital assistants (PDAs), enterprise digital assistants (EDAs), digital still cameras, digital video cameras, audio devices, portable multimedia players (PMPs), personal navigation devices (PNDs), MP3 players, handheld game consoles, e-books, wearable devices, and the like.

The host device 100 may include a mode manager 110 and a storage driver 120. The mode manager 110 may create a mode change request REQ_M as an operating mode of a file and/or folder is changed by a user. A folder may include at least one file and may refer to a unit in which the at least one file is managed by the host device 100. Also, the operating mode may include a high-speed mode or a low-speed mode according to an operation speed when data included in the file and/or folder is input/output to or from the storage device 200.

In addition, the mode manager 110 may extract a logical address of the file and/or folder of which an operating mode is set to the high-speed mode or the low-speed mode. Extracting a logical address of a folder may refer to extracting a logical address of each of at least one file included in the folder.

The mode manager 110 may provide a logical address to the storage device 200 together with the mode change request REQ_M. When data corresponding to the logical address is written to or read from the storage device 200, the storage device 200 may operate at a high speed or data may be written to the storage device 200 at a low speed through the mode change request REQ_M. In an embodiment, when first data is created as a file included in a folder is changed, the mode manager 110 may create the mode change request REQ_M for the first data and extract a logical address of the first data.

The host device 100 may provide information on the file and/or folder to a user. For example, the host device 100 may display a file and/or folder icon on a display screen connected to the host device 100. The user may change an operating mode of the file and/or folder by clicking the file and/or folder icon and changing settings related to the file and/or folder. Further details thereof may be described below with reference to FIGS. 5 and 11.

The storage driver 120 may transmit the mode change request REQ_M and the logical address created by the mode manager 110 to the storage device 200.

In addition, the storage driver 120 may include a management table 130 including information on an operating mode of the file and/or folder. The management table 130 may include operating modes of files and/or folders and respective paths. In an embodiment, the storage driver 120 may add information of the file and/or folder to the management table 130 as the file and/or folder is set to the high-speed mode, and may delete information of the file and/or folder from the management table 130 as the file and/or folder is set to the low-speed mode. In an embodiment, as the file and/or folder is set to the high-speed mode or the low-speed mode, the storage driver 120 may write information of the file and/or folder to correspond to an operating mode in the management table 130.

Although FIG. 1 shows an embodiment where the management table 130 is included in the storage driver 120, the present disclosure is not limited thereto. For example, the storage driver 120 may be included in a memory in the host device 100.

The host device 100 may communicate with the storage device 200 through various interfaces. In an embodiment, the host device 100 may communicate with the storage device 200 through the storage driver 120.

In an embodiment, the host device 100 may communicate with the storage device 200 through various interfaces such as universal serial buses (USBs), MultiMedia Card (MMC), PCI Express (PCI-E), AT attachment (ATA), serial AT attachment (SATA), parallel AT attachment (PATA), small computer system interfaces (SCSIs), serial attached SCSIs (SASs), enhanced small disk interfaces (ESDIs), integrated drive electronics (IDE), and the like. In addition, non-volatile memory express (NVMe) has been considered as an interface optimized for the storage device 200 such as a solid-state drive (SSD), and a non-volatile memory express over fabrics (NVMeoF) interface may be applied to the storage system 1000 of the present disclosure.

The storage device 200 may include a memory controller 210 and a memory device 220. The memory controller 210 may generally control the memory device 220.

According to the mode change request REQ_M received from the host device 100, the memory controller 210 may write data in the high-speed mode or the low-speed mode, or read written data in the high-speed mode or the low-speed mode. In addition, the memory controller 210 may rewrite data in the high-speed mode and invalidate data already written in the low-speed mode. Similarly, the memory controller 210 may rewrite data in the low-speed mode and invalidate data already written in the high-speed mode. In embodiments of the present disclosure, the chronological order of invalidating existing data and rewriting new data is not limited to any particular one, and may be substantially simultaneous.

In an embodiment using the high-speed mode, the memory device 220 may write data to a single-level cell (SLC) or read data written in the SLC.

In an embodiment using the low-speed mode, the memory device 220 may write data to a multi-level cell (MLC) or write data to a triple-level cell (TLC). Also, the memory device may read data written in the MLC or TLC.

The storage device 200 may include storage mediums for storing data according to a request from the host device 100. In an embodiment, the storage device 200 may be an SSD. For example, the storage device 200 may be an Ethernet-attached storage drive (EASD).

When the storage device 200 includes a flash memory, the flash memory may include a two-dimensional (2D) NAND memory array and/or a three-dimensional (3D) (or vertical) NAND (VNAND) memory array. The 3D memory array may be formed in a monolithic manner on an array of memory cells having an active region disposed on a silicon substrate or at least one physical level of circuitry formed on or within the substrate as circuitry associated with an operation of the memory cells. The term "monolithic" means that the layers of each level constituting the array are stacked directly on top of the layers of each lower level of the array.

In an embodiment, the 3D memory array includes vertical NAND strings arranged in a vertical direction such that at least one memory cell is positioned on another memory cell. The at least one memory cell may include a charge trap layer.

In the storage system 10 according to an embodiment of the present disclosure, the user may set a speed of a data operation of a file and/or folder to a high speed or a low speed, and thus, an input/output speed of data may be increased.

In addition, a data operation speed of a file and/or folder selected by the user as being of high importance may be selectively set, thus enabling efficient data management and increasing user convenience.

Figure 2:
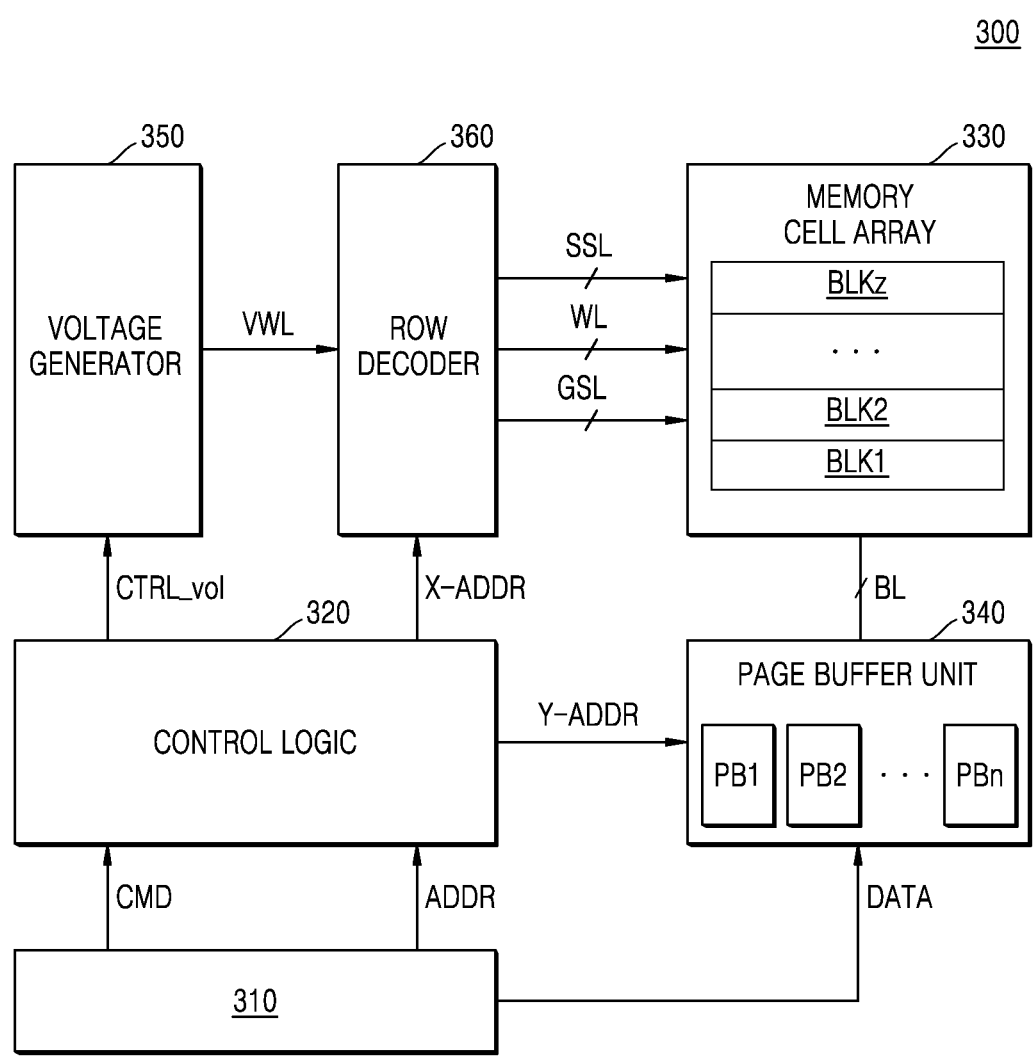
FIG. 2 is a block diagram illustrating a memory device according to an embodiment of the present disclosure.

FIG. 2 illustrates a memory device according to an embodiment of the present disclosure.

Referring to FIG. 2, a memory device 300 may include a control logic circuit 320, a memory cell array 330, a page buffer unit 340, a voltage generator 350, and a row decoder 360. The memory device 300 may further include a memory interface circuit 310, and may further include column logic, a pre-decoder, a temperature sensor, a command decoder, an address decoder, and the like.

The control logic circuit 320 may generally control various operations in the memory device 300. The control logic circuit 320 may output various control signals in response to a command CMD and/or an address ADDR from the memory interface circuit 310. For example, the control logic circuit 320 may output a voltage control signal CTRL_vol, a row address X-ADDR, and a column address Y-ADDR.

The memory cell array 330 may include a plurality of memory blocks BLK1 to BLKz (z is a positive integer), and each of the memory blocks BLK1 to BLKz may include a plurality of memory cells. The memory cell array 330 may be connected to the page buffer unit 340 through the bit lines BL and may be connected to the row decoder 360 through word lines WL, string select lines SSL, and ground select lines GSL.

In an embodiment, the memory cell array 330 may include a 3D memory cell array, and the 3D memory cell array may include a plurality of NAND strings. Each NAND string may include memory cells respectively connected to word lines stacked vertically on the substrate. U.S. Pat. Nos. 7,679,133; 8,553,466; 8,654,587; 8,559,235; and U.S. Application Publication No. 2011/0233648 are incorporated by reference herein in their entireties. In an embodiment, the memory cell array 330 may include a 2D memory cell array, and the 2D memory cell array may include a plurality of NAND strings arranged in row and column directions.

The memory cell array 330 may include at least one of an SLC, an MLC, and/or a TLC. The SLC may refer to a memory cell programmed with 1 bit, the MLC may refer to a memory cell programmed with 2 bits, and the TLC may refer to a memory cell programmed with 3 bits.

The control logic circuit 320 may create a control signal for writing data to the SLC or reading data written in the SLC in the high-speed mode. In the low-speed mode, the control logic circuit 320 may create a control signal for writing data to the MLC or the TLC or reading data from the MLC or the TLC. Also, the control logic circuit 320 may create a control signal for writing data to the MLC or the TLC and invalidating data written in the SLC. Conversely, the control logic circuit 320 may create a control signal for writing data to the SLC and invalidating data written in the MLC or TLC. In addition, the order of the operation of the control logic circuit 320 creating the control signal for rewriting and the operation of creating the control signal for invalidation is not limited.

In an embodiment, an erase operation on invalidated data may be performed when a free block is created as pieces of data included in at least any one of the memory blocks BLK1 to BLKz are invalidated or when certain data is written to the free block.

The page buffer unit 340 may include a plurality of page buffers PB1 to PBn (where n is an integer of 3 or greater), and the page buffers PB1 to PBn may be connected to the memory cells through the bit lines BL, respectively. The page buffer unit 340 may select at least one of the bit lines BL in response to the column address Y-ADDR. The page buffer unit 340 may operate as a write driver or a sense amplifier according to an operating mode. For example, during a program operation, the page buffer unit 340 may apply a bit line voltage corresponding to data to be programmed to a selected bit line. During a read operation, the page buffer unit 340 may detect a current or voltage of the selected bit line to detect data stored in the memory cell.

The voltage generator 350 may create various types of voltages for performing program, read, and erase operations based on the voltage control signal CTRL_vol. For example, the voltage generator 350 may create a program voltage, a read voltage, a program verification voltage, an erase voltage, or the like as a word line voltage VWL.

The row decoder 360 may select one of the word lines WL in response to the row address X-ADDR and may select one of the string select lines SSL. For example, during a program operation, the row decoder 360 may apply the program voltage and the program verification voltage to the selected word line, and during a read operation, the row decoder 360 may apply the read voltage to the selected word line.

Figure 3:
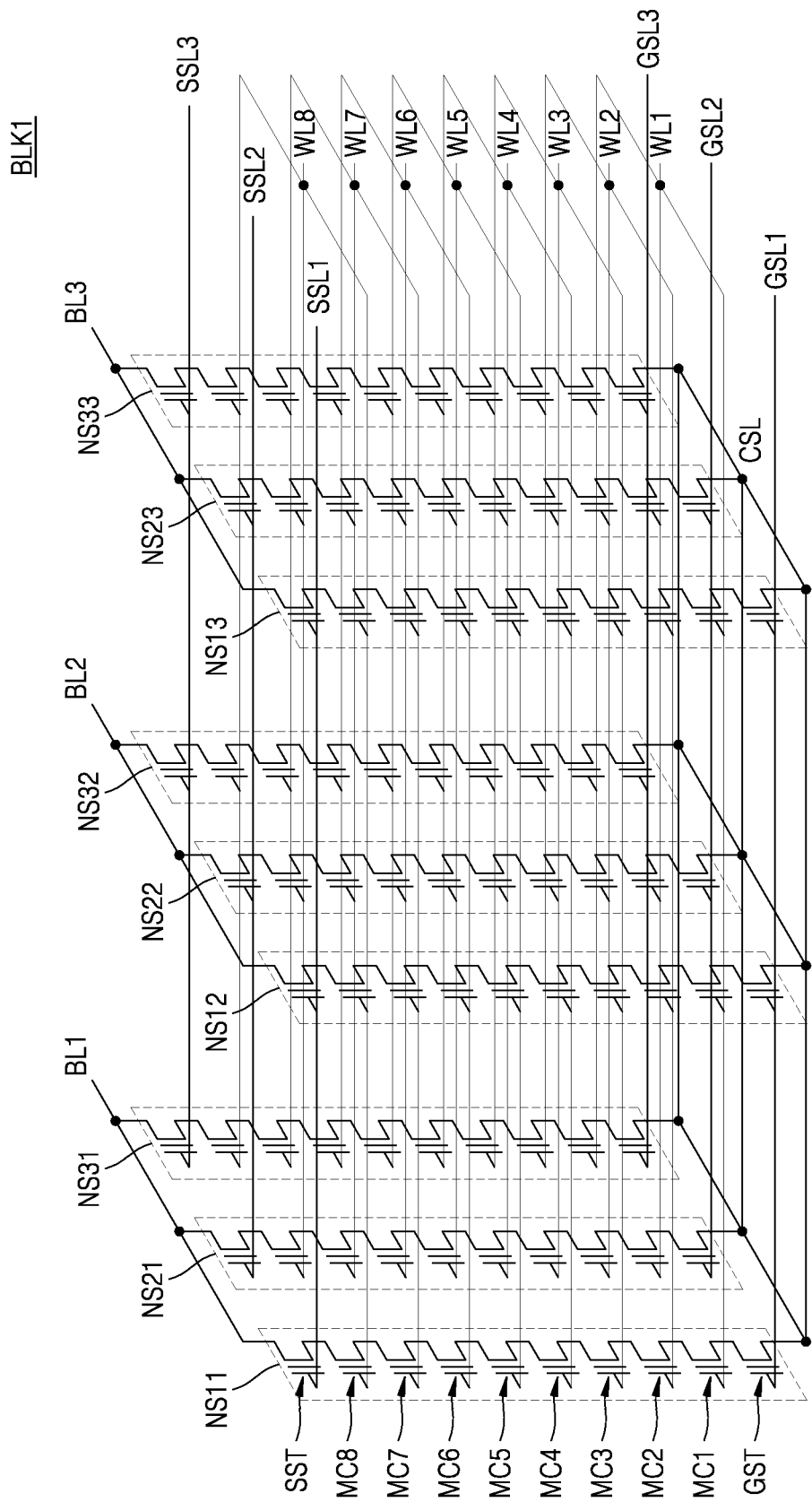
FIG. 3 is a circuit diagram illustrating a memory cell array according to an embodiment of the present disclosure.

FIG. 3 illustrates a memory cell array according to an embodiment of the present disclosure.

Referring to FIG. 3, the memory block BLK1 may correspond to one of the memory blocks BLK1 to BLKz of FIG. 2 and may include a plurality of NAND strings NS11 to NS13, NS21 to NS 23, and NS 31 to NS33, a plurality of ground select lines GLS1 to GSL3, a plurality of string select lines SSL1 to SSL3, and a common source line CSL. Here, the number of NAND strings, the number of word lines, the number of bit lines, the number of ground select lines, and the number of string select lines may be variously changed according to embodiments.

The NAND strings NS11, NS21, and NS31 may be provided between a first bit line BL1 and the common source line CSL, the NAND strings NS12, NS22, and NS32 may be provided between a second bit line BL2 and the common source line CSL, and the NAND strings NS13, NS23, and NS33 may be provided between a third bit line BL3 and the common source line CSL. Each NAND string (e.g., NS11) may include a string select transistor SST, a plurality of memory cells MC1 to MC8, and a ground select transistor GST connected in series.

The string select transistor SST may be connected to the corresponding string select lines SSL1 to SSL3. The memory cells MC1 to MC8 may be respectively connected to corresponding word lines WL1 to WL8. The ground select transistor GST may be connected to the corresponding ground select lines GSL1 to GSL3. The string select transistor SST may be connected to the corresponding bit lines BL1 to BL3, and the ground select transistor GST may be connected to the common source line CSL.

In FIG. 3, each string is illustrated as including one string select transistor SST, but the present disclosure is not limited thereto. For example, each string may include an upper string select transistor and a lower string select transistor connected in series. In addition, in FIG. 3, each string is illustrated as including one ground select transistor GST, but the present disclosure is not limited thereto. For example, each string may include an upper ground select transistor and a lower ground select transistor connected in series. Here, the upper ground select transistor may be connected to the corresponding ground select lines GSL1 to GSL3, and the lower ground select transistor may be commonly connected to a common ground select line.

Figure 4A:
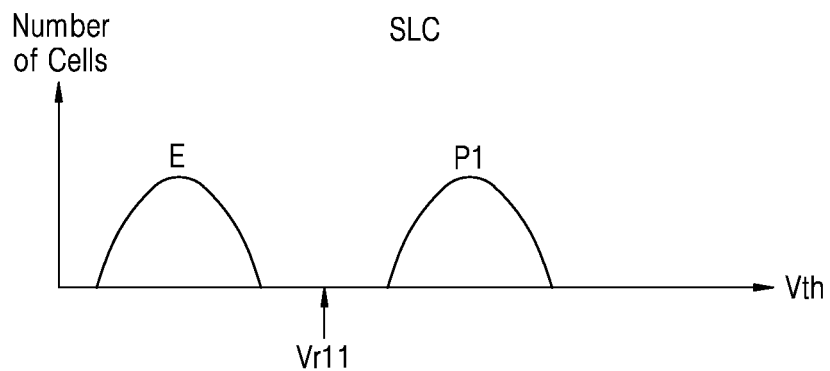
FIGS. 4A to 4C are graphical diagrams illustrating distribution according to threshold voltages after program completion of a memory device according to an embodiment of the present disclosure.
Figure 4B:
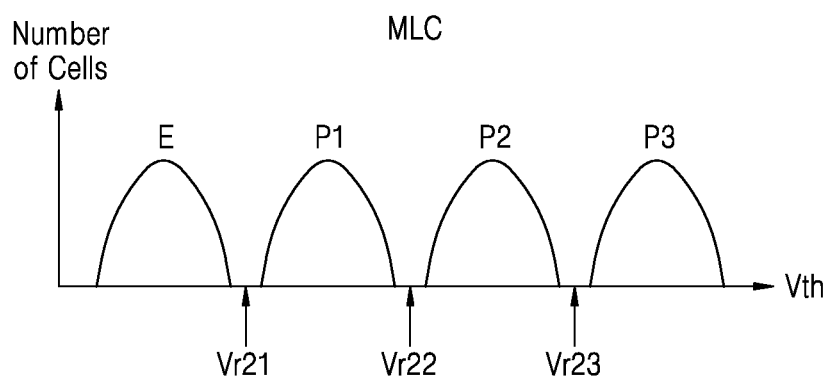
Figure 4C:
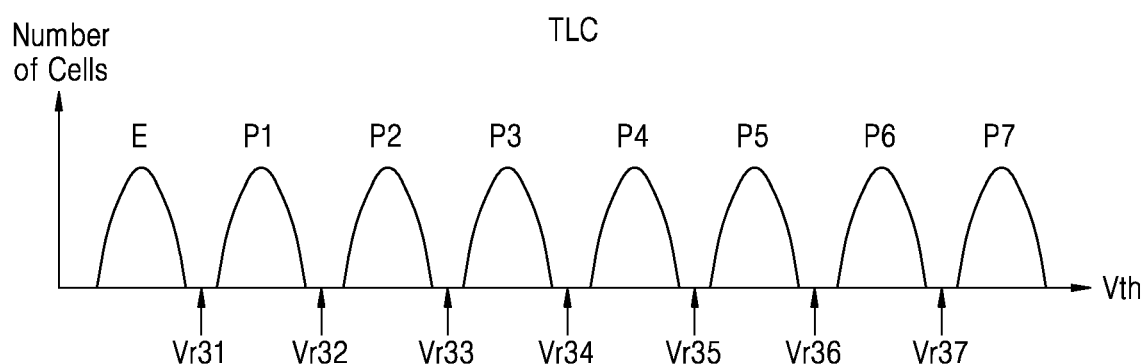

FIGS. 4A to 4C illustrate distribution according to threshold voltages after program completion of a memory device according to an embodiment of the present disclosure.

In FIGS. 4A to 4C, a memory cell may correspond to any one of the memory cells MC1 to MC8 of FIG. 3. FIG. 4A shows a case in which the memory cell is an SLC, FIG. 4B shows a case in which the memory cell is an MLC, and FIG. 4C shows a case in which the memory cell is a TLC. In FIGS. 4A to 4C, the horizontal axis represents a threshold voltage Vth, and the vertical axis represents the expected distribution or number of memory cells.

Referring to FIG. 4A, when the memory cell is an SLC programmed with one bit, the memory cell may have one of an erase state E or a first program state P1. A first read voltage Vr11 has a voltage level between a distribution of the memory cell having the erase state E and a distribution of the memory cell having the first program state P1. Whether the memory cell has the erase state E or the first program state P1 may be classified based on the first read voltage Vr11.

Referring to FIG. 4B, when the memory cell is an MLC programmed with two bits, the memory cell may have one of the erase state E, the first program state P1, a second program state P2, or a third program state P3. Compared to the SLC, in the case of the MLC, an interval between the threshold voltage Vth distributions may be narrow. Each of first to third read voltages Vr21, Vr22, and Vr23 may correspond to an initially set default level. Whether the memory cell has one of the erase state E or one of the first to third program states P1 to P3 may be classified based on the first to third read voltages Vr21, Vr22, and Vr23.

Referring to FIG. 4C, when the memory cell is a TLC programmed with 3 bits, the memory cell may have one of the erase state E or first to seventh program states P1 to P7. Each of the first to seventh read voltages Vr31 to Vr37 may correspond to an initially set default level. Whether the memory cell has one of the erase state E or one of the first to seventh program states P1 to P7 may be classified based on the first to seventh read voltages Vr31 to Vr37.

In addition, a maximum value of the threshold voltage of the SLC may be less than a maximum value of the threshold voltage of the MLC, and the maximum value of the threshold voltage of the MLC may be less than a maximum value of the threshold voltage of the TLC. Alternatively, a maximum range of the threshold voltage of the SLC may be less than a maximum range of the threshold voltages of the MLC, and the maximum range of the threshold voltages of the MLC may be less than a maximum range of the threshold voltages of the TLC.

According to an embodiment of the present disclosure, a write speed and a read speed for the SLC may be faster than a write speed and a read speed for the MLC, respectively; and the write speed and the read speed for MLC may be faster than a write speed and a read speed for the TLC, respectively. Because the SLC stores 1-bit data, and the MLC and the TLC store 2-bit data and 3-bit data, respectively, the MLC may store a larger amount of data than the SLC, and the TLC may store a larger amount of data than the MLC, for the same number of memory cells.

Therefore, according to an embodiment of the present disclosure, data which is frequently input/output, data set with high importance by the user, data requiring a fast input/output speed, and the like may be written to the SLC to utilize the fast input/output speed. Conversely, data which is less frequently input/output, data set with low importance, data not requiring a fast input/output speed, and the like may be written to the MLC or the TLC to efficiently utilize storage space of the memory device.

Figure 5:
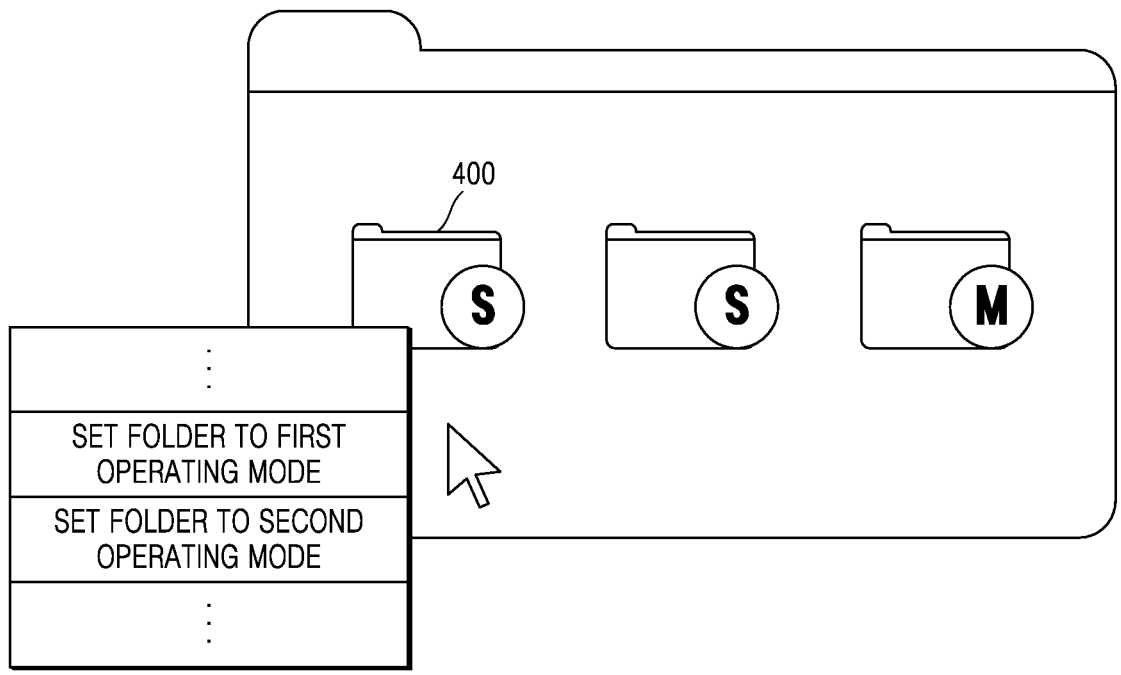
FIG. 5 is a hybrid diagram of setting an operating mode of a folder according to an embodiment of the present disclosure.

FIG. 5 illustrates setting an operating mode of a folder according to an embodiment of the present disclosure.

Referring to FIG. 5, the user may click an icon of the folder 400 and set an operating mode of a folder 400 in a setting list displayed when clicking. In an embodiment, the user may set the operating mode of the folder 400 to a first operating mode or set the operating mode to a second operating mode (or cancel the setting of the first operating mode).

For example, if the user right-clicks the icon of the folder 400, a setting list may be displayed. The setting list may include an item for setting the clicked folder 400 to the first operating mode S (e.g., SLC or Speed prioritization) and an item for setting the clicked folder 400 to the second operating mode M (e.g., MLC or Memory size prioritization). For example, the first operating mode may be a high-speed mode for setting a data speed of at least one file included in the folder 400 to a high speed, and the second operating mode may be a low-speed mode. For example, the first operating mode may be an SLC mode for writing at least one file included in the folder 400 to the SLC of the memory device, and the second operating mode may be an MLC mode for writing at least one file included in the folder 400 to the MLC or a TLC mode for writing at least one file included in the folder 400 to the TLC of the memory device.

In an embodiment, the first operating mode S may be an SLC mode for writing at least one file included in the folder 400 to the SLC of the memory device, the second operating mode M may be an MLC mode for writing at least one file included in the folder 400 to the MLC, and a third operating mode T may be a TLC mode for writing at least one file included in the folder 400 to the TLC of the memory device. For example, the first operating mode S may be for speed prioritization of small data sets, the second operating mode M may offer a middle prioritization balancing speed and memory utilization for medium data sets, and the third operating mode T may offer a third prioritization to maximize total memory utilization for large data sets.

The user may change the operating mode of at least one file included in the folder 400 at once by changing the operating mode of the folder 400.

The operating mode of the folder 400 may be displayed together with the icon of the folder 400. For example, the operating mode may be displayed on a lower right end portion of the icon of the folder 400. ⓢ may be a symbol indicating the first operating mode, and ⓜ may be a symbol indicating the second operating mode.

In an embodiment, the user may add a certain file to the folder 400. In this case, an operating mode of the added file may be the same as the operating mode set in the folder 400. As an example, the user may create a new file by changing or modifying a file included in the folder 400. An operating mode of the created file may be the same as the operating mode set in the folder 400.

Figure 6:
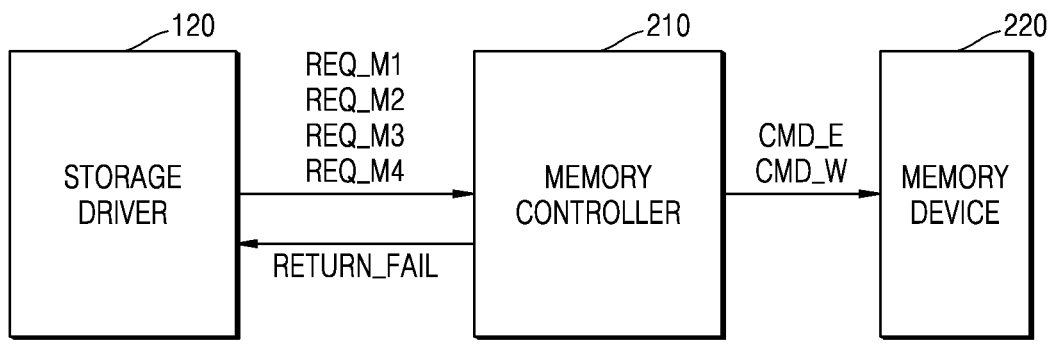
FIG. 6 is a block diagram illustrating a portion of a storage system according to an embodiment of the present disclosure.

FIG. 6 illustrates a portion of a storage system according to an embodiment of the present disclosure.

Referring to FIG. 6, when first to fourth mode change requests REQ_M1 to REQ_M4 are created by a mode manager, the storage driver 120 may provide the first to fourth mode change requests REQ_M1 to REQ_M4 to the storage device. In this case, data may be included in each of the first to fourth mode change requests REQ_M1 to REQ_M4, and each of the first to fourth mode change requests REQ_M1 to REQ_M4 may be transmitted, and the data may be transmitted together. The data may include a logical address of a file and/or folder in which an operating mode is changed.

The first mode change request REQ_M1 may be created as the operating mode of the folder is changed to the high-speed mode. The second mode change request REQ_M2 may be created as the operating mode of the folder is changed to the low-speed mode. The third mode change request REQ_M3 may be created as a certain file is added to the folder. The fourth mode change request REQ_M4 may be created as a file in the folder is changed or modified.

The operation of the memory controller 210 may vary according to each of the first to fourth mode change requests REQ_M1 to REQ_M4. As an example, when the memory controller 210 receives the first mode change request REQ_M1, the memory controller 210 may create an erase command CMD_E for invalidating data, such as existing data already written to correspond to a logical address and a write command CMD_W for writing data in the SLC mode, and provide the created erase and write commands CMD_E and CMD_W to the memory device 220. In this case, the existing data may be written in the MLC mode, for example, or the TLC mode. When the storage space of the memory device 220 is insufficient, the memory controller 210 may create a failure message RETURN_FAIL as a response message with respect to the first mode change request, and transmit the failure message RETURN_FAIL to the storage device. In this case, the existing data may be maintained.

As an example, when the memory controller 210 receives the second mode change request REQ_M2, the memory controller 210 may create an erase command CMD_E for invalidating data, such as existing data already written to correspond to a logical address and a write command CMD_W for writing data in the MLC or TLC mode, and provide the created erase and write commands CMD_E and CMD_W to the memory device 220. In this case, the existing data may be written in the SLC mode.

As an example, when the memory controller 210 receives the third mode change request REQ_M3, the memory controller 210 may receive data including a logical address for the added first file. The memory controller 210 may create a write command CMD_W for writing data in the SLC mode and provide the created write command CMD_W to the memory device 220.

As an example, when the memory controller 210 receives the fourth mode change request REQ_M4, the memory controller 210 may receive data including a logical address for a second file before a change and a logical address of a third file after the change. Here, the memory controller 210 may create the erase command CMD_E for invalidating the existing data written based on the logical address of the second file and create the write command CMD_W for writing data in the SLC mode based on the logical address for the third file. In this case, the order of creating the erase command CMD_E and the write command CMD_W is not limited thereto. The memory controller 210 may provide the erase and write commands CMD_E and CMD_W to the memory device 220.

Hereinafter, descriptions given below with reference to FIGS. 7 to 10 are based on an assumption that the operating mode is set and released in units of folders, but the present disclosure is not limited thereto. For example, the operating mode may be set and released in units of files.

Figure 7:
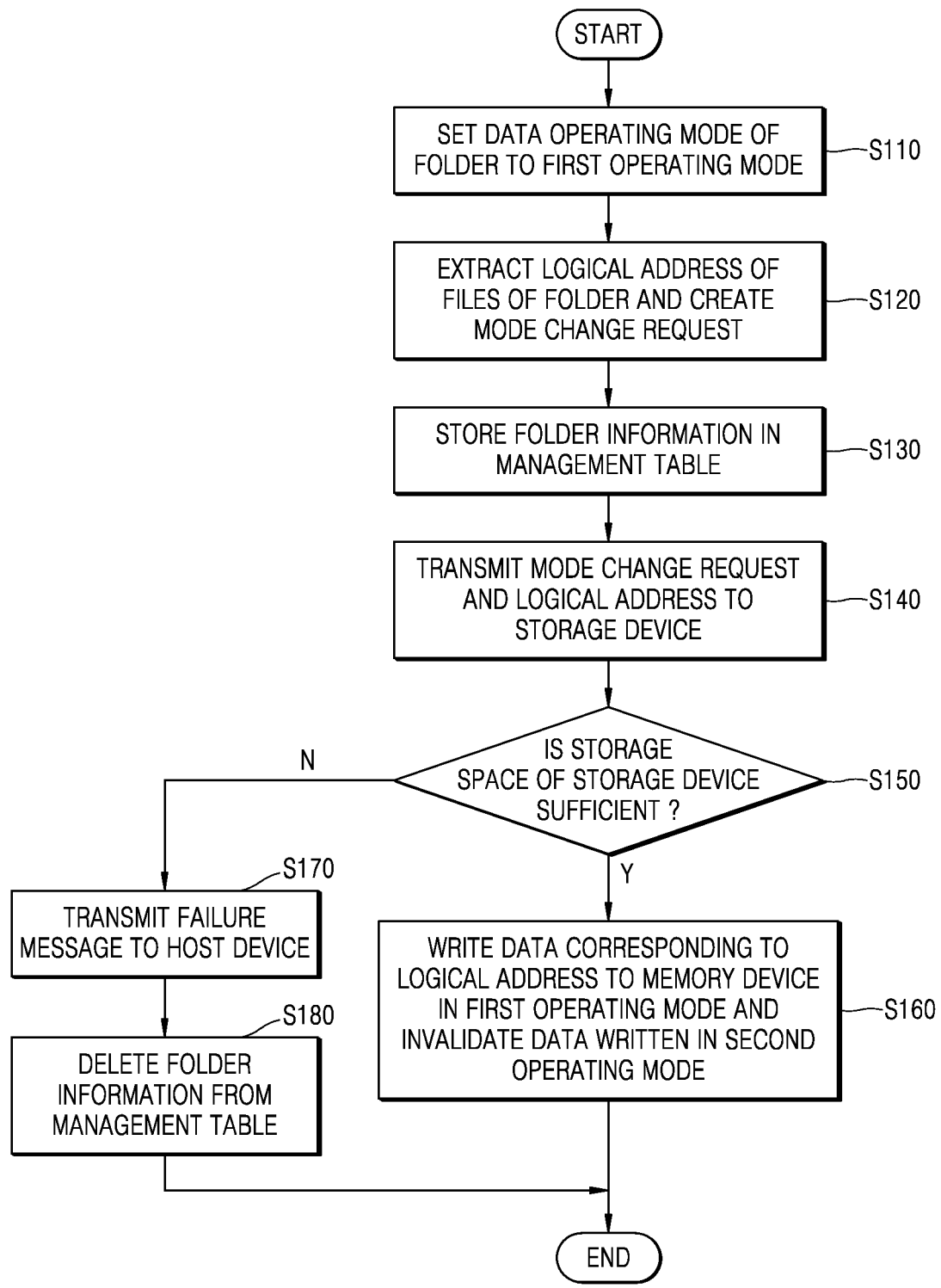
FIG. 7 is a flowchart diagram illustrating a method of setting a data operation speed of a folder to a high-speed mode according to an embodiment of the present disclosure.

FIG. 7 illustrates a method of setting a data operation speed of a folder to a high-speed mode according to an embodiment of the present disclosure.

Referring to FIGS. 1 and 7 together, a data operating mode of a folder may be set to the first operating mode (S110). For example, the first operating mode may be a high-speed mode or the SLC mode.

A logical address of a file included in the folder may be extracted, and the mode change request REQ_M may be created (S120). When the folder includes a plurality of files, a logical address of each file may be extracted. In an embodiment, the mode change request REQ_M may correspond to the first mode change request REQ_M1 of FIG. 6. Folder information may be stored in a management table 130 (S130). For example, a path of the folder may be stored in the management table 130. The mode change request REQ_M and the extracted logical address may be transmitted to the storage device 200 (S140). It may be determined whether the storage space of the storage device 200 is sufficient (S150).

When the storage space is sufficient, data corresponding to the logical address may be rewritten to the memory device 220 in the first operating mode, and when there is existing data already written to correspond to the data and the logical address, the existing data may be invalidated (S160). In this case, the existing data may be data which has been already written in the second operating mode to correspond to the logical address and the data. For example, the second operating mode may be any one of the low-speed mode, the MLC mode and/or the TLC mode.

If the storage space is insufficient, the storage device 200 may transmit a failure message to the host device 100 (S170). Thereafter, the folder information stored in operation S130 may be deleted from the management table 130 (S180).

Figure 8:
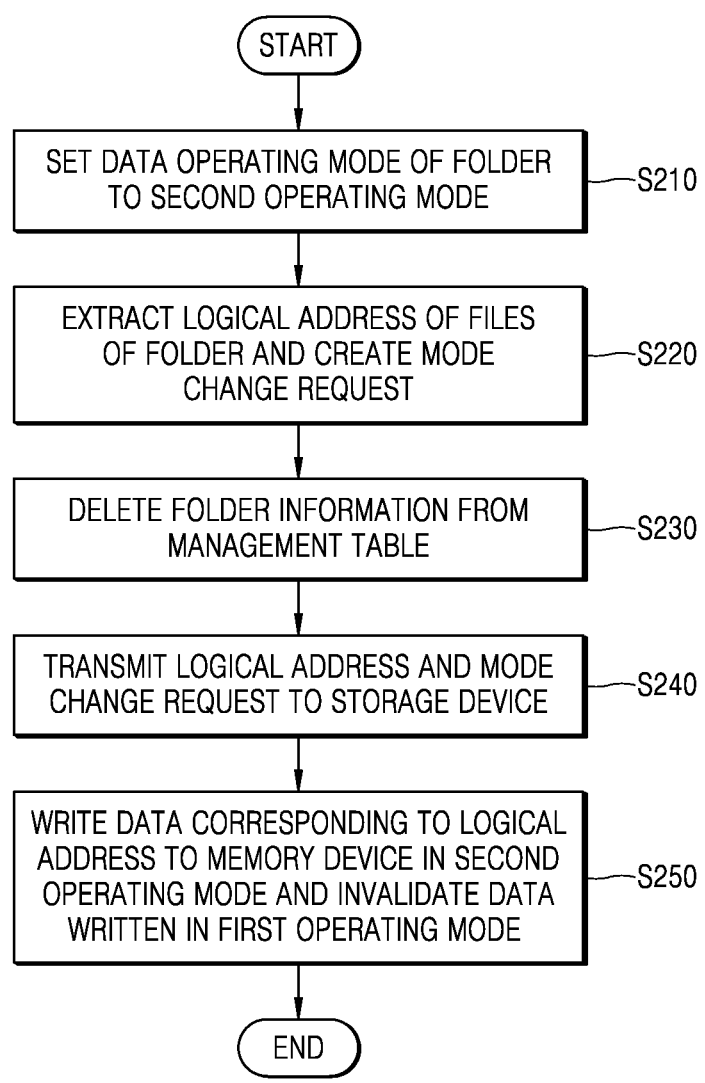
FIG. 8 is a flowchart diagram illustrating a method of setting a data operation speed of a folder to a low-speed mode according to an embodiment of the present disclosure.

FIG. 8 illustrates a method of setting a data operation speed of a folder to the low-speed mode according to an embodiment of the present disclosure.

Referring to FIG. 8, the data operating mode of a folder may be set to the second operating mode (S210). For example, the second operating mode may be any one of the low-speed mode, the MLC mode, and the TLC mode. A logical address of a file included in the folder may be extracted, and the mode change request REQ_M may be created (S220). In an embodiment, the mode change request REQ_M may correspond to the second mode change request REQ_M2 of FIG. 6. Folder information may be deleted from the management table 130 (S230). In an embodiment, instead of deleting the folder information from the management table 130, an operating mode of the folder may be matched to the folder information and stored.

The mode change request REQ_M and the extracted logical address may be transmitted to the storage device 200 (S240). Data may be written again in the second operating mode, and existing data that has already been written to correspond to the logical address may be invalidated (S250). For example, the data may correspond to the data of FIG. 7, and the existing data may include data written in the first operating mode in operation S160 of FIG. 7. For example, the first operating mode may be the high-speed mode or the SLC mode.

Figure 9:
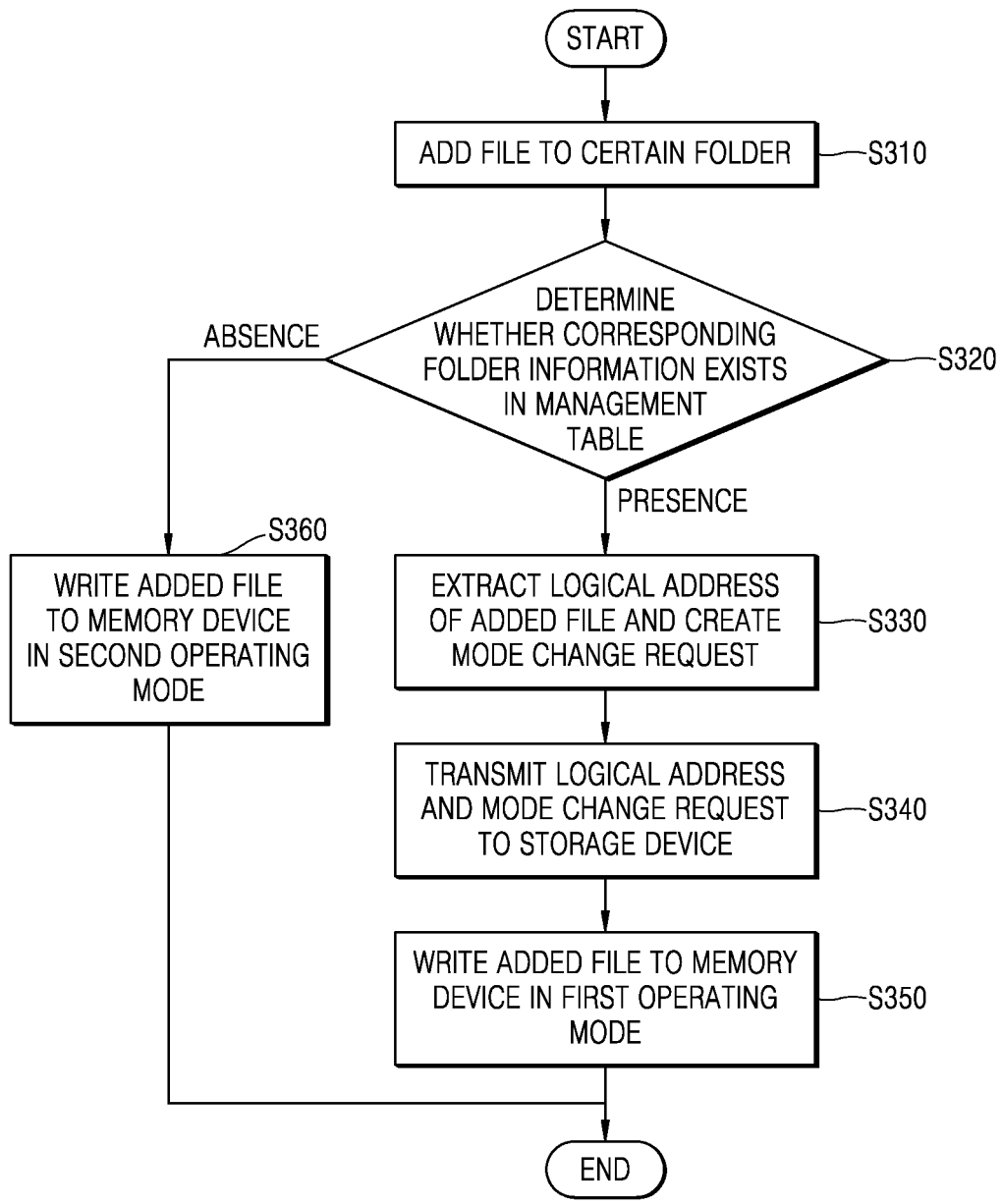
FIG. 9 is a flowchart diagram illustrating an operation of adding a file to a folder according to an embodiment of the present disclosure.

FIG. 9 illustrates an operation of adding a file to a folder according to an embodiment of the present disclosure.

Referring to FIG. 9, a file may be added to a certain folder (S310). For example, a plurality of files may be added. An operation for determining whether information on the certain folder exists in the management table 130 may be performed (S320). That is, it may be determined whether an operating mode of the certain folder is the first operating mode.

When there is information on the certain folder in the management table 130, a logical address of the added file may be extracted, and the mode change request REQ_M may be created (S330). In this case, a write request may be created instead of the mode change request REQ_M. When a plurality of files are added in operation S310, a logical address of each file may be extracted. In an embodiment, the mode change request REQ_M may correspond to the third mode change request REQ_M3 of FIG. 6.

The mode change request REQ_M and the extracted logical address may be transmitted to the storage device 200 (S340). The added file to correspond to the logical address may be written in the memory device 220 in the first operating mode (S350). For example, the first operating mode may be the high-speed mode or the SLC mode. When there is no information on the certain folder in the management table 130, the added file may be written in the memory device 220 in the second operating mode (S460). For example, the second operating mode may be any one of the low-speed mode, the MLC mode, and the TLC mode.

Figure 10:
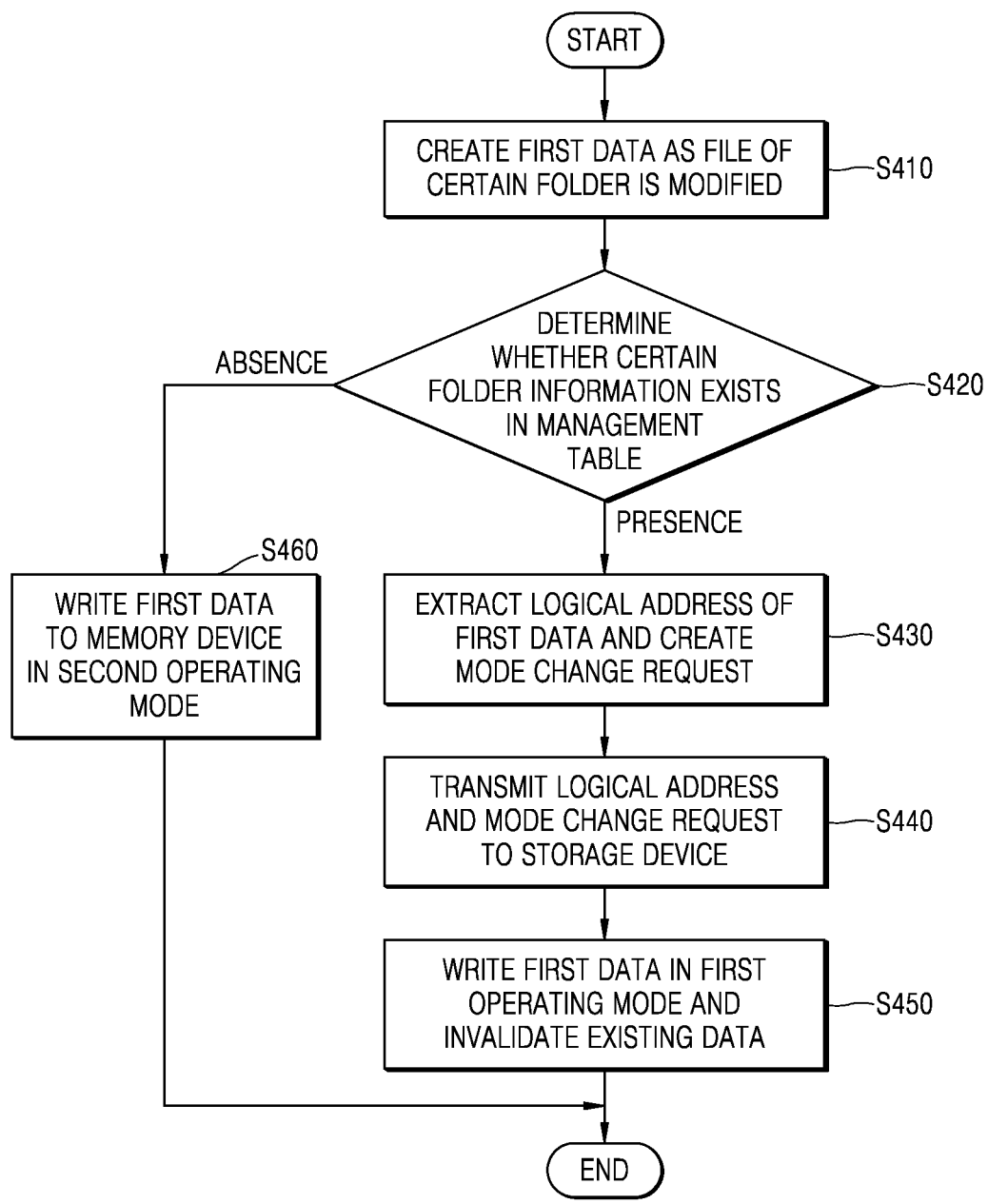
FIG. 10 is a flowchart diagram illustrating an operation when a file in a folder is modified according to an embodiment of the present disclosure.

FIG. 10 illustrates an operation when a file in a folder is modified according to an embodiment of the present disclosure.

Referring to FIG. 10, first data may be created as a file in a certain folder is modified (S410). The first data may refer to a modified file. The first data may include a plurality of modified files. An operation for determining whether information on the certain folder exists in the management table 130 may be performed (S420). That is, it may be determined whether an operating mode of the certain folder is the first operating mode.

When there is information on the certain folder in the management table 130, a logical address of the first data may be extracted and the mode change request REQ_M may be created (S430). In an embodiment, the mode change request REQ_M may correspond to the fourth mode change request REQ_M4 of FIG. 6. In this case, a logical address of the file before the change may be further extracted.

The mode change request REQ_M and the extracted logical address may be transmitted to the storage device 200 (S440). In the first operating mode, data may be rewritten based on the logical address, and existing data for the file before the change may be invalidated (S450). In this case, the existing data may be data which has been written in the first operating mode. Also, the first operating mode may be the high-speed mode or the SLC mode. When there is no information on the certain folder in the management table 130, the first data may be written in the memory device 220 in the second operating mode (S460). For example, the second operating mode may be any one of the low-speed mode, the MLC mode, and the TLC mode.

Figure 11:
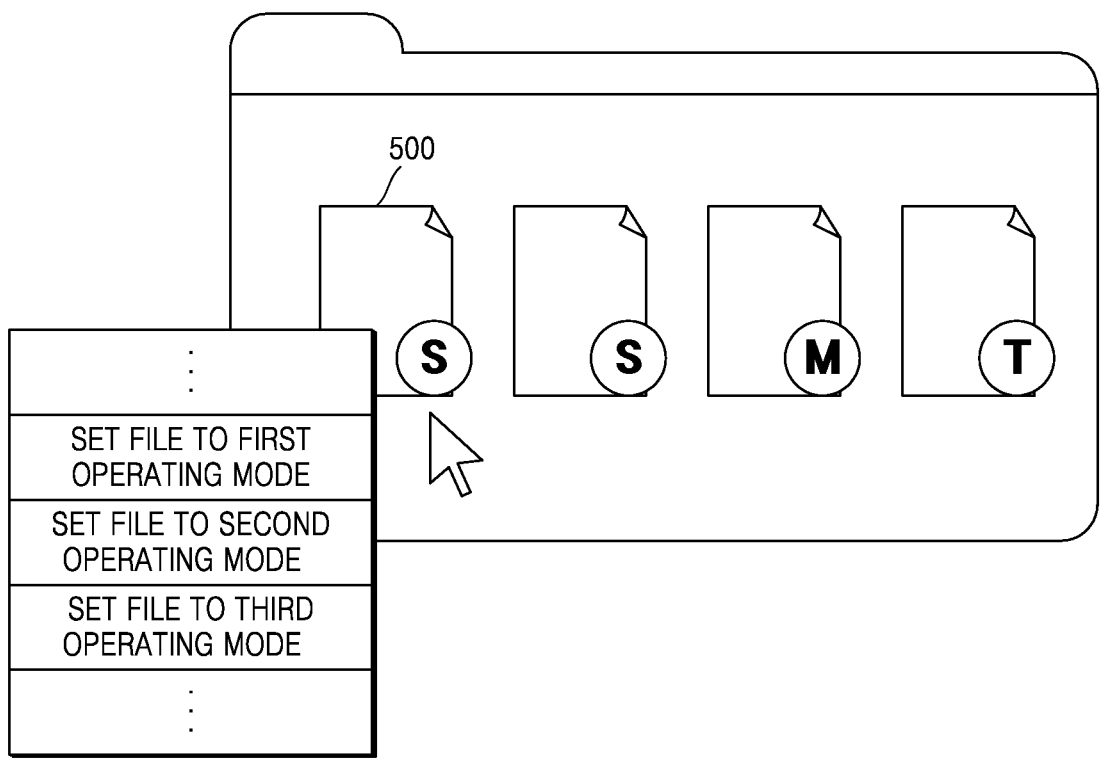
FIG. 11 is a hybrid diagram of setting an operating mode of a file according to an embodiment of the present disclosure.

FIG. 11 illustrates setting an operating mode of a file 500 according to an embodiment of the present disclosure.

Although FIG. 7 through FIG. 10 show first and second operating modes for illustrative purposes, it shall be understood that alternate embodiments may employ additional operating modes. For example, if the first operating mode were for SLC flash memory, and the second operating mode were for MLC flash memory, the third operating mode could be for TLC flash memory, without limitation thereto. In such an embodiment, the method steps for the second operating mode would be like those for the first operating mode as shown in the flowcharts, and the method steps for the third operating mode would be like those for the second operating mode as shown in the flowcharts.

Referring to FIG. 11, the user may click the icon of the file 500 and set an operating mode of the file 500 in a setting list displayed when clicking.

For example, when the user right-clicks the icon of the file 500, the setting list may be displayed. The setting list may include an item for setting the clicked file 500 to a first operating mode S, an item for setting the clicked file 500 to a second operating mode M, and an item for setting the clicked file 500 to a third operating mode T. For example, the first operating mode may be the high-speed mode for setting a data speed of the selected file 500 to a high speed, the second operating mode may be a medium-speed mode, and the third operating mode may be a low-speed mode. For example, the first operating mode may be the SLC mode for writing the selected file 500 to the SLC of the memory device, the second operating mode may be the MLC mode for writing the selected file 500 to the MLC of the memory device, and the third operating mode may be the TLC mode for writing the selected file 500 to the TLC of the memory device.

The operating mode of the file 500 may be displayed together with the icon of the file 500. For example, the operating mode may be displayed on a lower right end portion of the icon of the file 500. ⓢ may be a symbol indicating the first operating mode and ⓜ may be a symbol indicating the second operating mode, but are not limited thereto.

Figure 12:
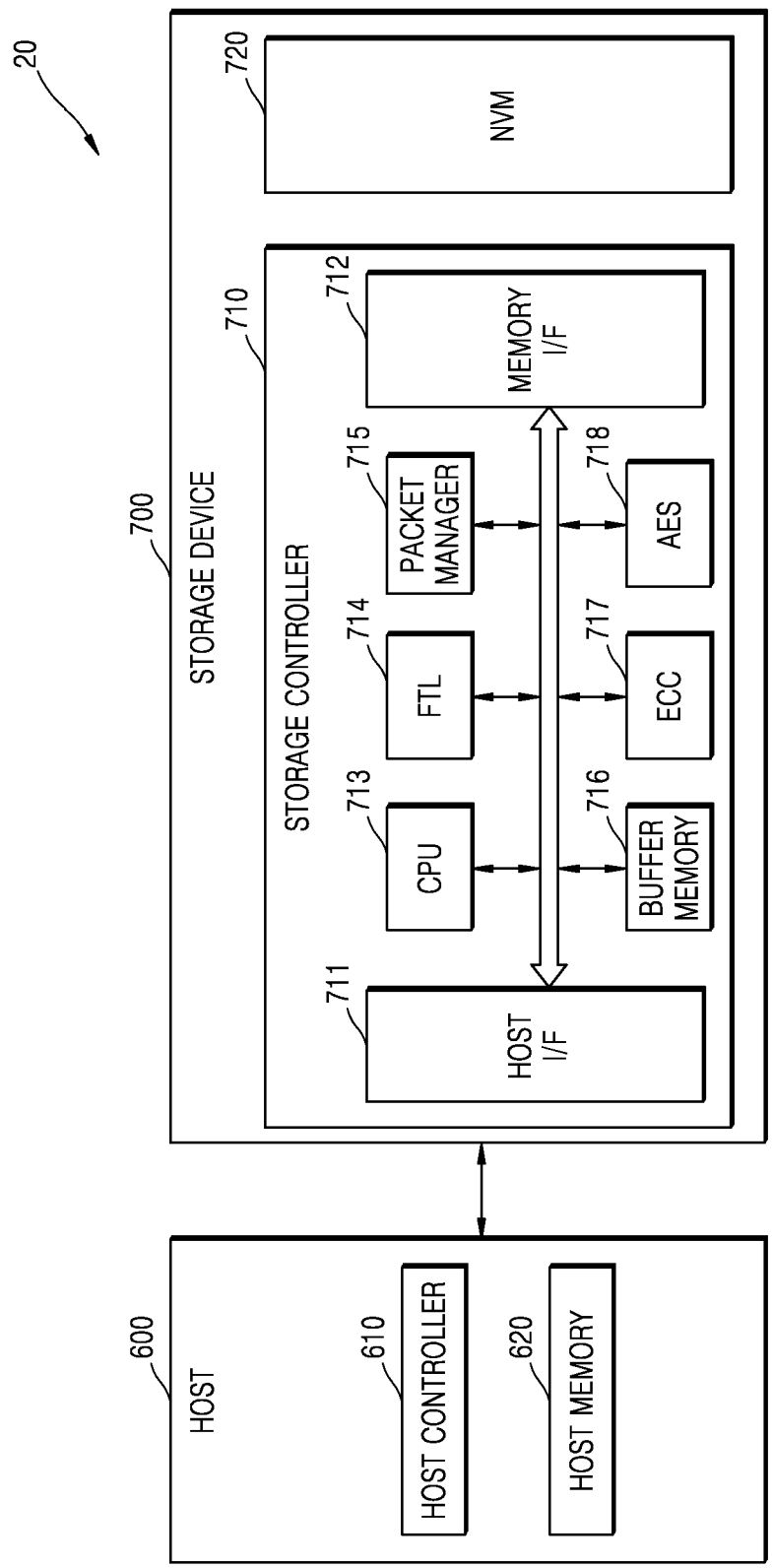
FIG. 12 is a block diagram illustrating a host-storage system according to an embodiment of the present disclosure.

FIG. 12 illustrates a host-storage system according to an embodiment of the present disclosure.

A host-storage system 20 may include a host 600 and a storage device 700. The host 600 may correspond to the host device 100 described above with reference to FIGS. 1 to 11, and the storage device 700 may correspond to the storage device 200 described above with reference to FIGS. 1 to 11.

The storage device 700 may include a storage controller 710 and a non-volatile memory (NVM) 720. Also, according to an embodiment of the present disclosure, the host 600 may include a host controller 610 and a host memory 620. The host memory 620 may function as a buffer memory for temporarily storing data to be transmitted to the storage device 700 or data transmitted from the storage device 700.

The storage device 700 may include storage mediums for storing data according to a request from the host 600. As an example, the storage device 700 may include at least one of an SSD, an embedded memory, and a removable external memory. When the storage device 700 is an SSD, the storage device 700 may be a device conforming to an NVMe standard. When the storage device 700 is an embedded memory or an external memory, the storage device 700 may be a device conforming to a universal flash storage (UFS) or an embedded multi-media card (eMMC) standard. The host 600 and the storage device 700 may each create a packet according to an adopted standard protocol and transmit the created packet.

When the NVM 720 of the storage device 700 includes a flash memory, the flash memory may include a 2D NAND memory array or a 3D (VNAND memory array. As another example, the storage device 700 may include various other types of non-volatile memories. For example, the storage device 700 may include magnetic random access memory (MRAM), spin-transfer torque MRAM, conductive bridging RAM (CBRAM), ferroelectric RAM (FeRAM), phase RAM (PRAM), resistive memories, and various other types of memories.

According to an embodiment, the host controller 610 and the host memory 620 may be implemented as separate semiconductor chips. Alternatively, in some embodiments, the host controller 610 and the host memory 620 may be integrated in the same semiconductor chip. As an example, the host controller 610 may be any one of a plurality of modules included in an application processor, and the application processor may be implemented as a system on chip (SoC). In addition, the host memory 620 may be an embedded memory included in the application processor or a non-volatile memory or a memory module disposed outside the application processor.

The host controller 610 may manage an operation of storing data (e.g., write data) of a buffer region in the NVM 720 or storing data (e.g., read data) from the NVM 720 in the buffer region.

The host controller 610 may include the mode manager 110 and the storage driver 120 of FIG. 1. Accordingly, as the operating mode of the file and/or folder is changed, the host controller 610 may extract a logical address of the file and/or folder and create a mode change request.

The storage controller 710 may include a host interface (I/F) 711, a memory I/F 712, and a central processing unit (CPU) 713. In addition, the storage controller 710 may further include a flash translation layer (FTL) 714, a packet manager 715, a buffer memory 716, an error correction code (ECC) 717, and an advanced encryption standard (AES) 718. The storage controller 710 may further include a working memory (not shown) into which the FTL 714 is loaded, and data writing and reading operations with respect to the NVM 720 may be controlled by the CPU 713 executing the FTL 714.

The storage controller 710 may correspond to the memory controller 210 of FIG. 1. Accordingly, the storage controller 710 may receive the mode change request REQ_M and a logical address and write data to any one of the SLC, the MLC, and the TLC based on the logical address. Also, the storage controller 710 may create at least one of a write command, an erase command, and a failure message according to the mode change request REQ_M.

The host interface 711 may transmit and receive packets to and from the host 600. A packet transmitted from the host 600 to the host I/F 711 may include a command or data to be written to the NVM 720, and a packet transmitted from the host I/F 711 to the host 600 may include a response to a command or data read from the NVM 720. The memory I/F 712 may transmit data to be written to the NVM 720 to the NVM 720 or receive data read from the NVM 720. The memory I/F 712 may be implemented to comply with a standard protocol such as toggle or open NAND flash interface (ONFI).

The FTL 714 may perform various functions such as address mapping, wear-leveling, and garbage collection. The address mapping operation is an operation of changing a logical address received from the host 600 into a physical address used to actually store data in the NVM 720. Wear-leveling is technology for preventing excessive degradation of a certain block by ensuring that blocks in the NVM 720 are used uniformly, and may be implemented through, for example, firmware technology for balancing erase counts of physical blocks. Garbage collection is technology for securing usable capacity in the NVM 720 by copying valid data of a block to a new block and then erasing an existing block.

The packet manager 715 may create a packet according to a protocol of an I/F negotiated with the host 600, or parse various types of information from the packet received from the host 600. Also, the buffer memory 716 may temporarily store data to be written to the NVM 720 or data to be read from the NVM 720. The buffer memory 716 may be provided in the storage controller 710, or may be disposed outside the storage controller 710.

The ECC engine 717 may perform an error detection and correction function on read data read from the NVM 720. In an embodiment, the ECC engine 717 may create parity bits for write data to be written to the NVM 720, and the created parity bits may be stored together with the write data in the NVM 720. When reading data from the NVM 720, the ECC engine 717 may correct an error of read data using the parity bits read from the NVM 720 together with the read data, and output error-corrected read data.

The AES engine 718 may perform at least one of an encryption operation and a decryption operation on data input to the storage controller 710 using a symmetric-key algorithm.

Figure 13:
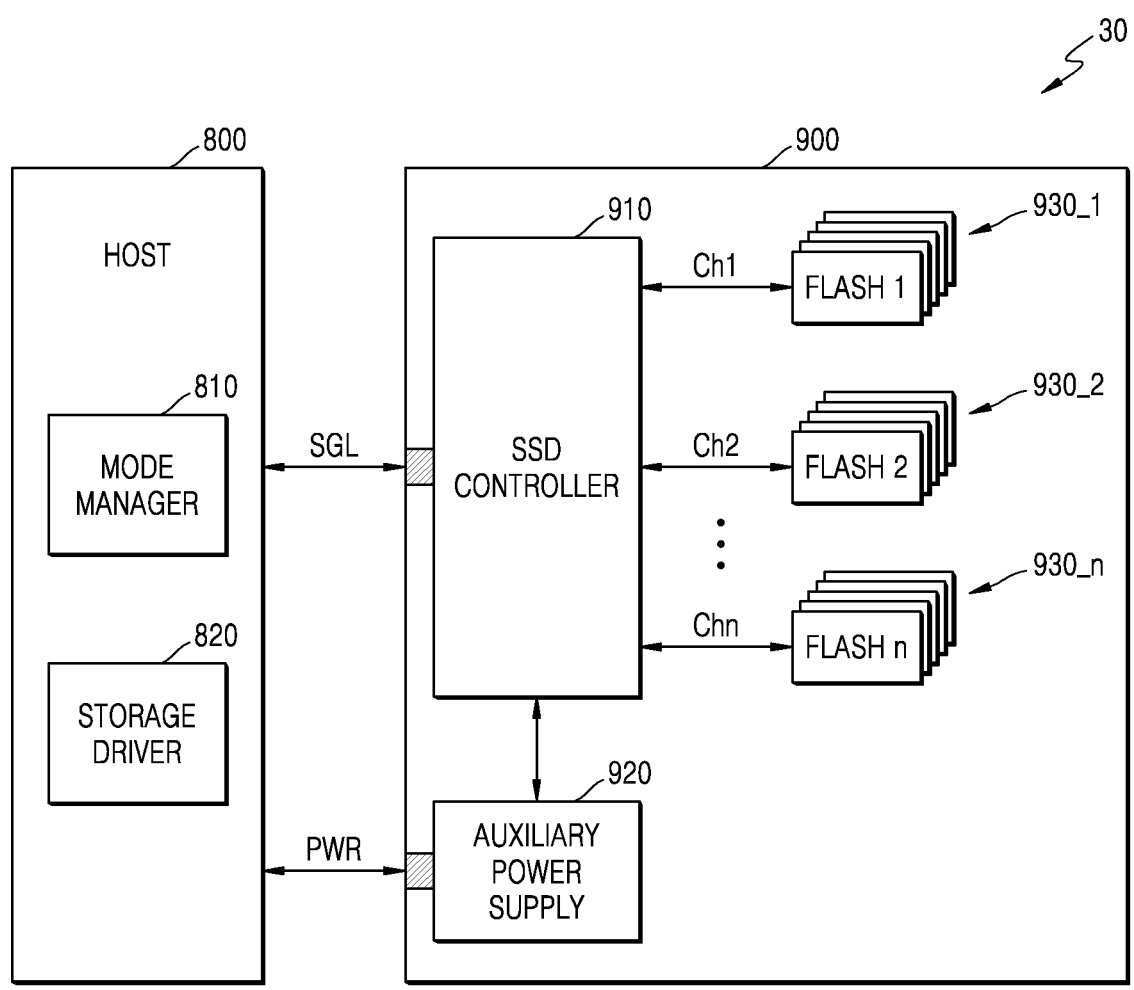
FIG. 13 is a block diagram illustrating a solid state drive (SSD) system according to an embodiment of the present disclosure.

FIG. 13 illustrates an SSD system according to an embodiment of the present disclosure.

Referring to FIG. 13, an SSD system 30 may include a host 800 and an SSD 900. The SSD 900 may transmit and receive signals to and from the host 800 through a signal connector, and may receive power through a power connector. The SSD 900 may include an SSD controller 910, an auxiliary power supply 920, and first to n-th memory devices 930_1 to 930_n.

Each of the first to n-th memory devices 930_1 to 930_n may include at least one of the SLC, the MLC, and the TLC. For example, the first memory device 930_1 may be configured as the SLC, the second memory device 930_2 may be configured as the MLC, and the n-th memory device 930_n may be configured as the TLC. However, the present disclosure is not limited thereto. Some memory blocks of the first memory device 930_1 may be configured as the SLC, and some memory blocks may be configured as the MLC.

The embodiments described above may be applied to the SSD system 30 shown in FIG. 13. According to an embodiment, the host 800 may include a mode manager 810 and a storage driver 820. In an embodiment, the mode manager 810 may extract a logical address of a file and/or folder as an operating mode of the file and/or folder is changed, and may create a mode change request. The storage driver 820 may manage information of a file and/or folder set in a first operating mode, and transmit a logical address and a mode change request to the SSD 900. In response to the mode change request, the SSD 900 may provide data to any one of a memory device including the SLC, a memory device including the MLC, and a memory device including the TLC, according to the logical address.

According to an embodiment of the present disclosure, as data is written to the memory device including the SLC, an improved read or write speed may be obtained. As data is written to the memory device including the MLC or the memory device including the TLC, a maximized storage space may be secured. An operation of setting a file and/or folder to a high-speed mode or a low-speed mode may be performed according to desired criteria.

While the present disclosure has been particularly shown and described with reference to embodiments thereof, it will be understood by those of ordinary skill in the pertinent art that various changes in form and details may be made therein without departing from the spirit and scope of the present disclosure as set forth in the following claims.

What is claimed is:

1. An operation method of a memory controller connected to a memory device, the operation method comprising:
receiving from a host a first mode change request for a folder, which is a unit for managing at least one file, and a logical address of the at least one file; and
in response to the first mode change request, rewriting to the memory device first data corresponding to the logical address in a second operating mode, and invalidating first data which is existing data already written to correspond to the logical address and the first data in a first operating mode,
wherein the first mode change request sets a data operation speed to a high-speed mode for the at least one file included in the folder.

2. The operation method of claim 1, further comprising:
further receiving a first logical address for a first file from the host as the first file is added to the folder; and
writing the first file to the memory device in the second operating mode based on the first logical address.

3. The operation method of claim 1, further comprising:
receiving a second mode change request for the folder and the logical address from the host; and
writing second data corresponding to the first data to the memory device in the first operating mode and invalidating the first data already written in the second operating mode, in response to the second mode change request,
wherein the second mode change request is to set the data operation speed for the at least one file included to a low-speed mode.

4. The operation method of claim 1, wherein the first mode change request is generated by a mode manager of the host in response to the setting of the folder to the high-speed mode.

5. The operation method of claim 4, wherein the logical address of the at least one file is extracted from the at least one file by the mode manager in response to the setting of the folder to the high-speed mode.

6. The operation method of claim 1, wherein:
the first operating mode includes a multi-level cell (MLC) mode for writing the first data in an MLC of the memory device or a triple-level cell (TLC) mode for writing the first data in a TLC of the memory device, and
the second operating mode includes a single-level cell (SLC) mode for writing the first data to an SLC of the memory device.

7. An operation method of a host connected to a storage device including a memory device, the operation method comprising:
setting, by the host, an operating mode of a folder, which is a unit for managing at least one file, to a first operating mode;
generating a first mode change request for setting a data operation speed to a high-speed mode for the at least one file and extracting a logical address of the at least one file;
adding information of the folder to a management table;
providing the first mode change request and the logical address to the storage device; and
receiving a response including whether writing of the at least one file is successful according to a storage space of the storage device with respect to the first mode change request.

8. The operation method of claim 7, wherein the first operating mode includes a single-level cell (SLC) mode for writing the at least one file included in the folder in an SLC of the memory device.

9. The operation method of claim 8, further comprising:
adding a first file to the folder;
creating a write request for writing the first file to the memory device in the SLC mode and further extracting a first logical address of the first file; and
providing the write request and the first logical address to the storage device.

10. The operation method of claim 8, further comprising:
creating a second file as a first file included in a first folder is changed;
determining whether information of the first folder exists in the management table;
creating a second mode change request for writing the second file to the memory device in the SLC mode as the information of the first folder exists in the management table, further extracting a first logical address of the first file, and invalidating existing data already written in the memory device based on the first file; and
providing the second mode change request and the first logical address to the storage device.

11. The operation method of claim 7, further comprising:
setting the operating mode of the folder to a second operating mode;
creating a second mode change request for setting a data operation speed for the at least one file included in the folder to a low-speed mode;
deleting the information of the folder from the management table; and
providing the second mode change request and the logical address to the storage device,
wherein the second operating mode includes a multi-level cell (MLC) mode for writing the at least one file included in the folder to an MLC of the memory device or a triple-level cell (TLC) mode for writing the at least one file to a TLC of the memory device.

12. The operation method of claim 8, wherein the receiving of the response includes:
receiving a failure message as a response to the first mode change request as the storage space is insufficient to write the at least one file in the SLC mode; and
deleting the information of the folder from the management table in response to the failure message.

13. The operation method of claim 8, wherein, as the storage space is sufficient to write the at least one file in the SLC mode, the at least one file is written to the memory device in the SLC mode and existing data written in the memory device is invalidated based on the at least one file.

14. A storage system comprising:
a host; and
a storage device,
wherein the host includes:
a mode manager configured to create a first mode change request and extract a logical address of data as an operating mode of the data is set to a first operating mode for setting at least one of a write speed or a read speed of the data to a high speed; and
a storage driver configured to create a management table including a path of the data and provide the first mode change request and the logical address to the storage device,
wherein the storage device is configured to rewrite the data in a single-level cell (SLC) and invalidate existing data already written in a multi-level cell (MLC) or a triple-level cell (TLC) of the memory device to correspond to the data and the logical address, in response to the first mode change request.

15. The storage system of claim 14, wherein:
the mode manager is configured to create a second mode change request as the operating mode of the data is set to a second operating mode for setting at least one of the write speed and the read speed of the data to a low speed, and
the second operating mode is configured to write the data in the MLC or the TLC of the memory device.

16. The storage system of claim 15, wherein the storage driver is configured to delete a path of the data from the management table as the operating mode of the data is set to the second operating mode.

17. The storage system of claim 14, wherein the data includes at least one of a folder which is a unit for managing a plurality of files, and the plurality of files.

18. The storage system of claim 14, wherein:
the mode manager is configured to, as first data is created as the data is changed, create a second mode change request for the first data and extract a first logical address of the first data, and
the storage driver is configured to provide the second mode change request and the first logical address to the storage device.

19. The storage system of claim 18, wherein the storage device is configured to write the first data in the SLC based on the logical address and the first logical address and invalidate the data already written in the memory device.

20. The storage system of claim 14, wherein the storage device includes a solid-state drive (SSD).

* * * * *